United States Patent [19]

Hasegawa et al.

[11] Patent Number: 4,736,409
[45] Date of Patent: Apr. 5, 1988

[54] CONTROL DATA TRANSMISSION SYSTEM FOR PRIVATE BRANCH EXCHANGE

[75] Inventors: Hiroyuki Hasegawa, Tokyo; Makoto Osada, Yokohama; Masakazu Shirakawa, Tokyo, all of Japan

[73] Assignee: Kabushiki Kaisha Toshiba, Kawsaki, Japan

[21] Appl. No.: 902,876

[22] Filed: Sep. 2, 1986

[30] Foreign Application Priority Data

Sep. 2, 1985 [JP] Japan .............................. 60-193400

[51] Int. Cl.$^4$ ..................... H04M 3/00; H04Q 11/04
[52] U.S. Cl. .................................. 379/269; 370/67; 370/85; 379/166
[58] Field of Search ................... 370/58, 67, 85; 379/269, 165, 166, 284

[56] References Cited

U.S. PATENT DOCUMENTS

| | | | |
|---|---|---|---|
| 4,379,950 | 4/1983 | Ahmed | 364/514 |
| 4,567,589 | 1/1986 | Lecomte et al. | 370/58 |
| 4,627,046 | 12/1986 | Bellamy | 370/58 |
| 4,653,047 | 3/1987 | Vij et al. | 370/58 |
| 4,694,452 | 9/1987 | Beckinger et al. | 370/58 |

Primary Examiner—Thomas W. Brown
Attorney, Agent, or Firm—Oblon, Fisher, Spivak, McClelland & Maier

[57] ABSTRACT

A private branch exchange includes a common control module and a plurality of line/trunk modules. A plurality of line/trunk cards are contained in a respective line/trunk module and terminals of the same type, such as digital telephones or standard telephones, are connected to the respective cards. For control data transmission, the line/trunk cards of each of the line/trunk modules are coupled to the common control module via a common control data highway. Each line/trunk card includes, for terminal control, a central processor unit (CPU) and random access memory (RAM) for storing a control program in accordance with the type of terminals. To the line/trunk card is allocated an individual address and group address representing a group of line/trunk cards to which are connected terminals of the same type. With the use of the group address the common control module collectively down-loads control data and program corresponding to the type of terminals into port controllers of line/trunk cards belonging to the same group.

4 Claims, 10 Drawing Sheets

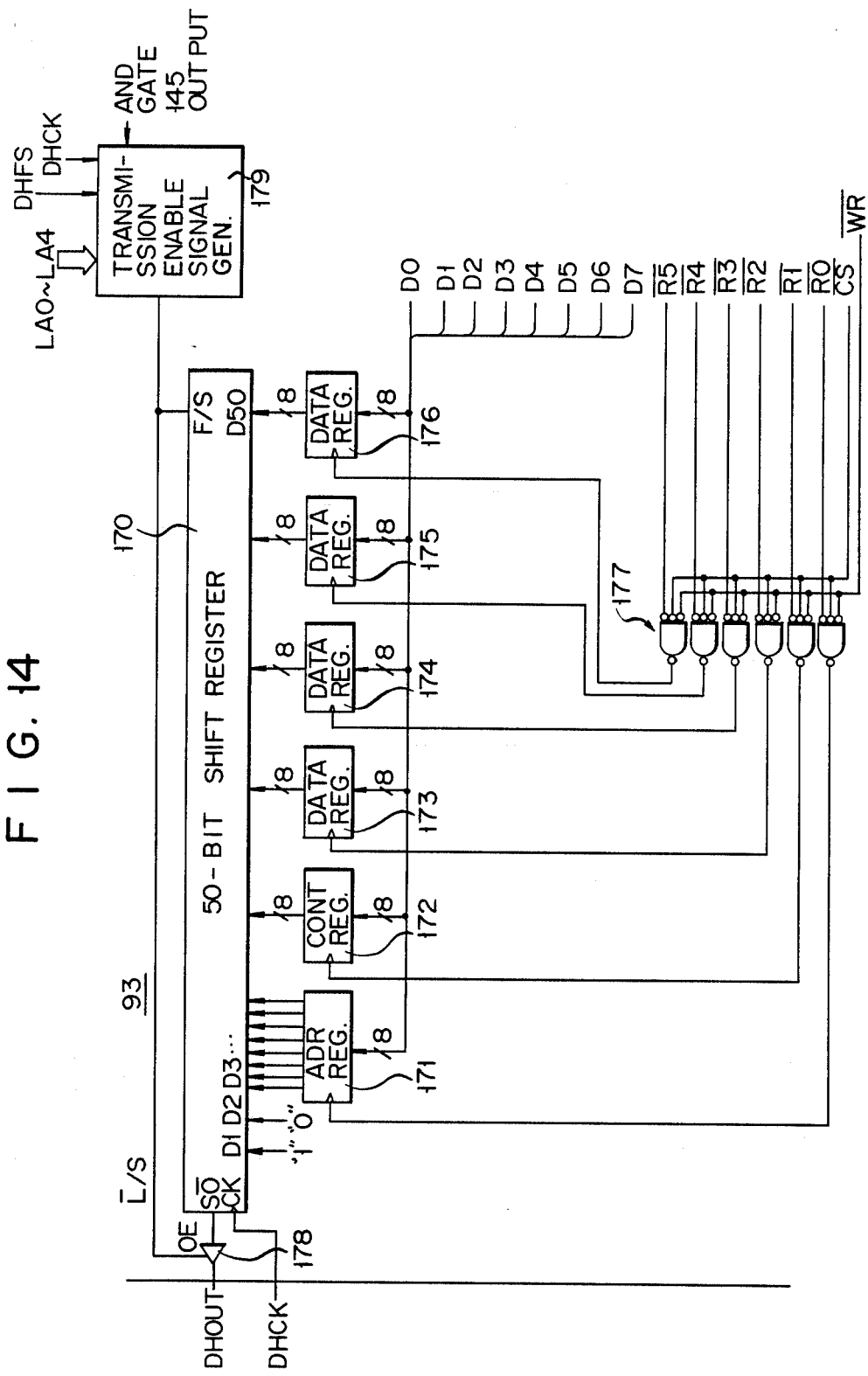
F I G. 14

CONTROL DATA TRANSMISSION SYSTEM FOR PRIVATE BRANCH EXCHANGE

BACKGROUND OF THE INVENTION

This invention relates to a private branch exchange for use in exchanging information among terminals such as telephones and, in particular, a control data transmission system in such private branch exchange.

Recently, a private branch exchange (PBX) is utilized to allow a call to be made between a telephone and an office line (public communication network) and between telephones in an office. A distribution-controlled PBX is known as one form of PBXs. In this PBX, a common control module and a plurality of line/trunk modules (shelves) are packed into a casing and the respective line/trunk module has a plurality of line/trunk cards to each of which are connected a plurality of telephones or data terminals. The common control module comprises local central processor unit (LCPU) cards corresponding to the respective line/trunk modules, main control processor unit (MCPU) card, time switch (TSW) card, etc. The line/trunk cards in the respective line/trunk module are connected via a control data highway to a corresponding LCPU card in the common control module and via a PCM highway to the TSW card. The TSW card is used for switching voice information transmitted over PCM highways from the line/trunk cards. The respective LCPU performs a control data communication with the line/trunk cards in the corresponding line/trunk module via the control data highway. The line/trunk card is provided for each type of terminals, such as standard telephones and digital telephones.

Recently, the advance in telephone technology requires the attainment of more functions and it is unavoidably accompanied by an increase in the amount of program in the common control module, in order to cope with the function of the terminals. This means an increase in a burden of processing on the common control module. For this reason, hardware, such as a central processor unit and random access memory (RAM), is needed on the line/trunk card to absorb different kinds of processing due to a difference in the type of terminals. It is preferred that, in order to flexibly deal with a change in the contents of processing as well as the demand for extended function of terminals, control data and processing program be down-loaded into RAMs of the respective line/trunk cards from the common control module. In this case, the loading of the program into each of the line/trunk cards leads to an increase in processing time as well as a decrease in system throughput.

SUMMARY OF THE INVENTION

An object of this invention is to provide an improved control data transmission system for a private branch exchange.

Another object of this invention is to provide a control data transmission system for a private branch exchange which includes line/trunk modules each having a plurality of line/trunk cards and a common control module, in which terminals of the same type are coupled to each line/trunk card, line/trunk cards to which are connected terminals of different types constitute different groups, and control data corresponding to the type of terminals are collectively down-loaded from the common control module into the line/trunk cards of the same group in one line/trunk module.

According to this invention a control data transmission system for use in a private branch exchange comprises: a control data highway; a plurality of line/trunk cards coupled to said control data highway and to each of which are coupled a plurality of terminals of the same type, a plurality of line/trunk cards associated with said terminals of the same type constituting a group, each of said line/trunk cards including an interface section coupled to said data control highway and to which are coupled address information inherently allocated to the respective line/trunk card and group address information commonly allocated to line/trunk cards belonging to the same group, a programmed port controller coupled to said interface section for receiving control data transmitted over said control data highway and addressed to itself, and terminal interface means coupled to said port controller to control said terminals in accordance with the control data; control means including data storage means for storing control data and control programs corresponding to the types of terminals, and data transmitting means coupled to said data storage means for sending in a predetermined format onto said control data highway, a control signal containing address information designating an individual line/trunk card or a group of line/trunk cards belonging to the same type and subsequent control data for controlling said terminals; said interface section of each of said line/trunk cards including address detecting means for detecting the address information in the control signal transmitted over said control data highway and for, upon detecting the address information allocated to it and a group address of the group to which it belongs, issuing a request to receive the control data subsequent to the address information to said port controller; and said control means being arranged to transmit the group address information and program data onto said control data highway when loading a program corresponding to the type of the terminals into said port controller in each of said line/trunk cards.

BRIEF DESCRIPTION OF THE DRAWINGS

FIG. 14 is a circuit diagram of a receiving register in FIG. 9; and

DETAILED DESCRIPTION OF THE PREFERRED EMBODIMENT

Figure 1:
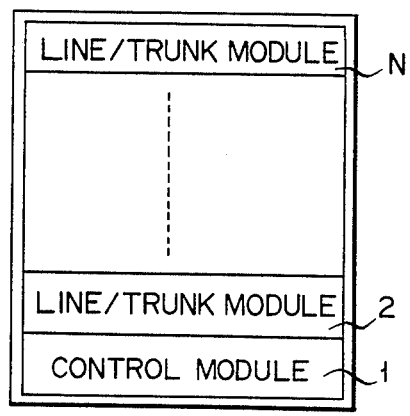
FIG. 1 shows an arrangement of a distribution controlled type private branch exchange system to which a control data transmission system of this invention is applied.

FIG. 1 shows a distribution-controlled type private branch exchange according to one embodiment of this invention which includes modules 1 to N packed in a case. Module 1 is a common control module including a main CPU (MCPU) card programmed for exchange processing, maintainance, etc., local CPU (LCPU) card for decoding an instruction issued from MCPU into control data corresponding to a type of terminals used, and time switch (TSW) card for performing data exchange processing between terminals. Modules 2 to N are line/trunk modules connected to standard telephones, digital multi-function telephones, data terminals, etc.

Figure 2:
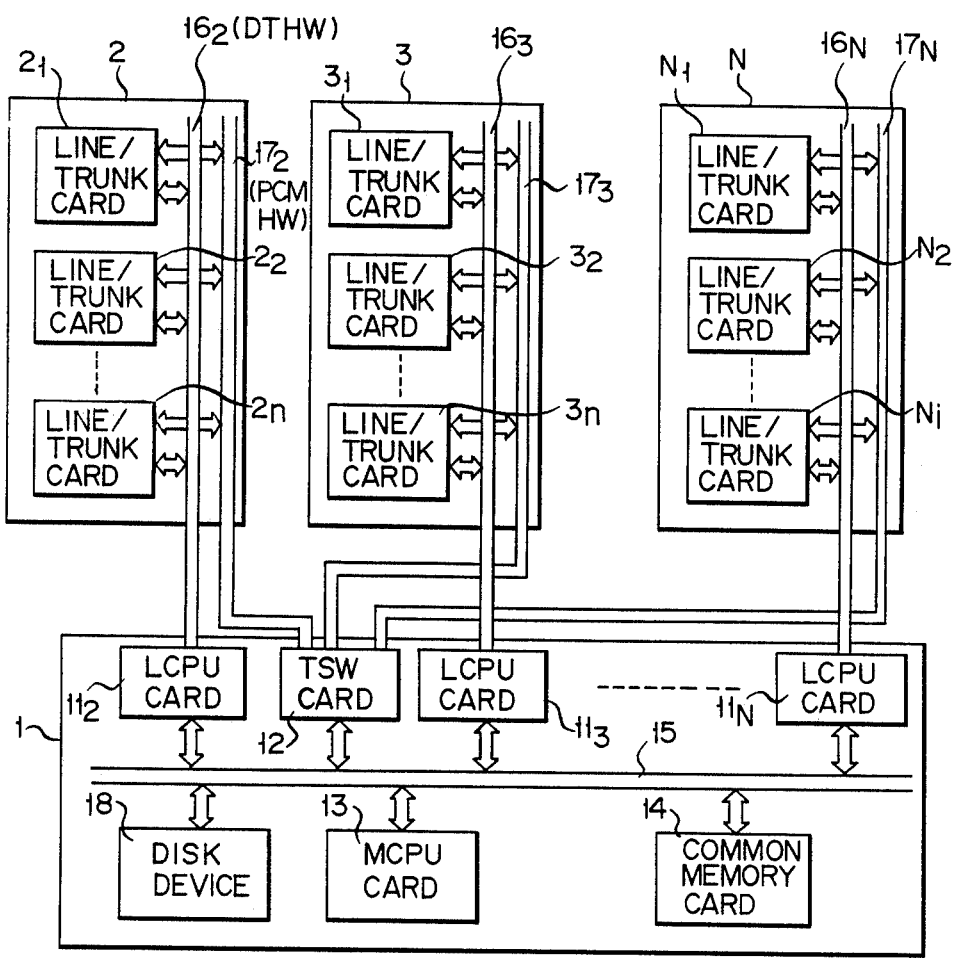
FIG. 2 is a block diagram of the exchange system of FIG. 1.

FIG. 2 is a block diagram of modules 1 to N in FIG. 1. Line/trunk modules 2, 3, ... N comprise line/trunk cards $2_1$ to $2_n$, $3_1$ to $3_m$, ... $N_l$ to $N_i$, respectively. To each of the line/trunk cards are connected a plurality of terminals (standard telephones or digital telephones) belonging to the same type.

Common control module 1 includes LCPU cards $11_2$ to $11_N$ corresponding to line/trunk modules 2 to N, TSW card 12, MCPU card 13, common memory card 14 and floppy disk (hardware disk) device 18. LCPU card $11_2$ to $11_N$, TSW card 12, MCPU card 13, common memory card 14 and disk device 18 are connected together via a common bus (for example, IEEE 796) 15. Line/-trunk cards $2_1$ to $2_n$ of module 2 are connected to corresponding LCPU card $11_2$ via common control data highway (DTHW) $16_2$ and to TSW card 12 via common PCM highway (PCMHW) $17_2$. Similarly, module 3 is connected to corresponding LCPU card $11_3$ via common control highway $16_3$ and to TSW card 12 via common PCM highway $17_3$. Module N is connected to LCPU card $11_N$ via common control highway $16_N$ and to TSW card 12 via common PCM highway $17_N$. Control data transfer between the respective line/trunk module and the common control module is effected in a serial form via the control data highway and speech data, such as voice information, is transferred in a serial form via the PCM highway.

Figure 3:
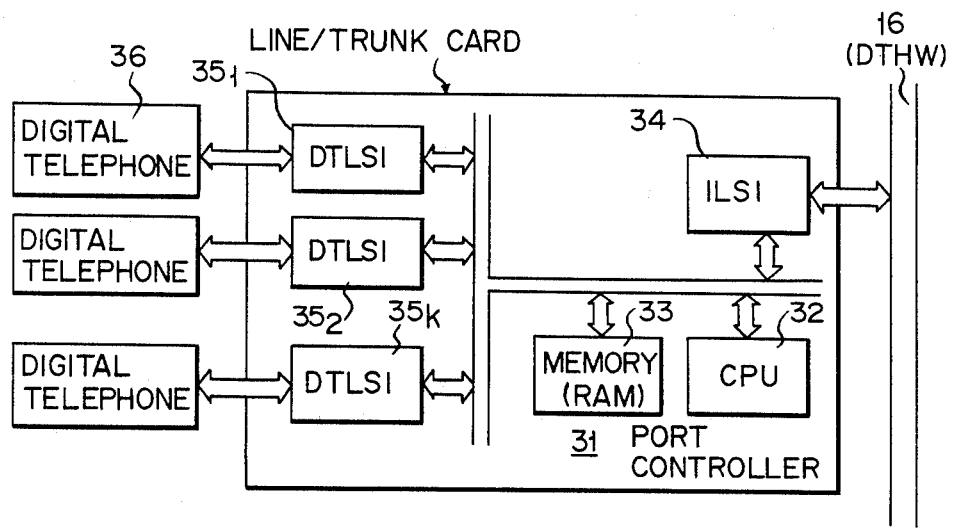
FIG. 3 shows an arrangement of a line/trunk card in FIG. 1.

To the respective line/trunk card is coupled a plurality of data terminals of the same type, i.e., standard telephones or digital telephones. FIG. 3 is a block diagram of the line/trunk card for telephones. According to this invention, the line/trunk card includes port controller (PC) 31 comprised of CPU 32 and RAM 33. Interface LSI (large scale integrated circuit hereinafter referred to as ILSI) is provided in line/trunk card and is connected to corresponding LCPU card via the control highway. As in the case of the existing line/trunk cards, LSI (DTLSI) $35_1$ to $35_K$ for digital telephones are provided in line/trunk card and a digital telephone 36 is coupled to an output port via four lines: two lines for voice data transmission and two for control code transmission. ILSI 34 communicates with the corresponding LCPU card via the control highway and controls a communication between port controller 31 and digital telephone 36. As will be set forth below, control data and program for controlling telephones and office lines are loaded via the control highway and ILSI 34 into RAM 33 in the line/trunk card.

Figure 4:
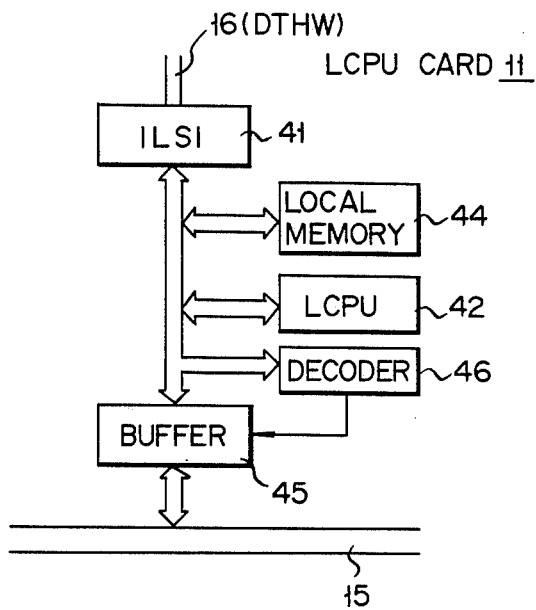
FIG. 4 shows an arrangement of an LCPU card in FIG. 1.

FIG. 4 is a block diagram of LCPU cards $11_1$ to $11_N$ in common control module 1. In FIG. 4, ILSI 41 is of the same type as ILSI 34 in FIG. 3 and is connected to the respective line/trunk card ILSI via control highway 16. As will be set forth above, ILSI is switched between a master operation mode and a slave operation mode by an external control input. ILSI 41 in the LCPU card operates in the master mode in which case control data is fed to the line/trunk cards in synchronism with a transition in time slots. On the other hand, ILSI in each line/trunk card operates in the slave mode in which the data is sent to the LCPU card within a time slot alone which has been externally designated. Local CPU 42 is connected via local bus 43 to ILSI 41 so as to control ILSI 41. To local bus 43, local memory 44 is connected which stores program and data for operating LCPU 42. The program and data are loaded into the memory from disk device 18 in FIG. 2.

LCPU 42 is connected to common bus 15 via buffer 45. Different addresses are allocated to local memory 44 and common memory card 14. When LCPU 42 gains access to common memory card 14, if address decoder 46 detects an address allocated to the common memory card, buffer 45 is enabled to connect local bus 43 to common bus 15. As a result, LCPU 42 gains access to common memory card 14.

Figure 5:
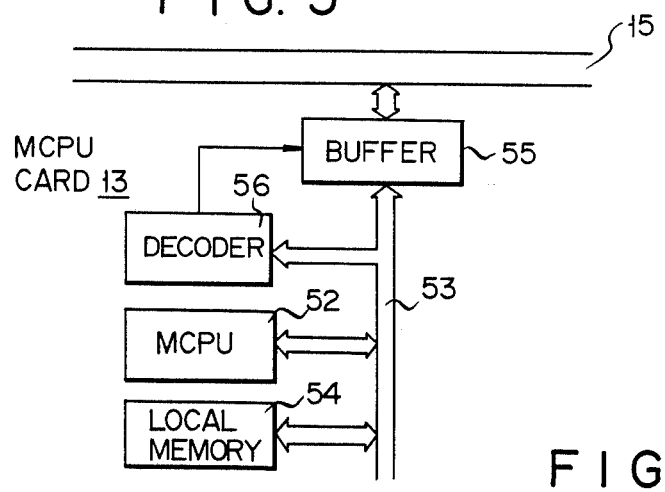
FIG. 5 shows an arrangement of an MCPU card in FIG. 1.

FIG. 5 is a block diagram of MCPU card 13 of substantially the same configuration as the LCPU card in FIG. 4. MCPU card 13 is comprised of MCPU 52, local bus 53, local memory 54, buffer 55 and address decoder 56.

Figure 6:
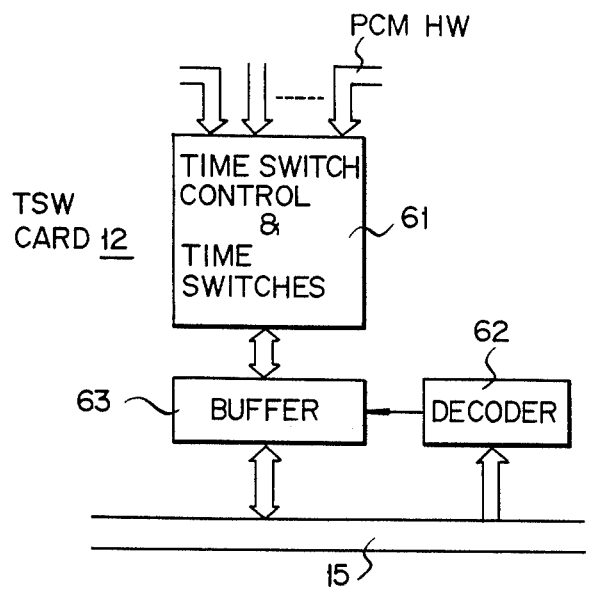
FIG. 6 shows an arrangement of a TSW card in FIG. 1.

FIG. 6 is a block diagram of the TSW card. In this TSW card, time switches and time switch control 61 are connected to the PCM highways to effect switching communication data from terminals under control of MCPU 13. Address decoder 62 connected to common bus 15 detects an access to time switch control 61, enabling buffer 63 to connect time switch control 61 in TSW card 12 to common bus 15.

Figure 7:
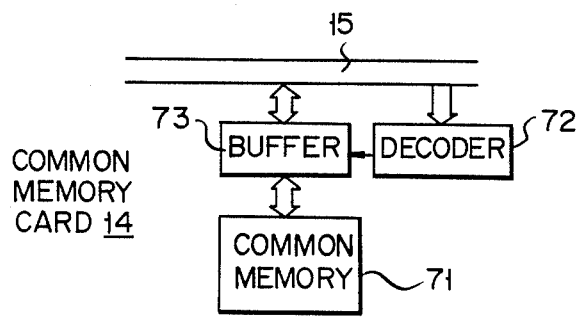
FIG. 7 shows an arrangement of a common memory card in FIG. 1.

FIG. 7 is a block diagram of the common memory card. In the common memory card, common memory 71 is accessed by MCPU card 13 and LCPU cards $11_2$ to $11_N$ and, when address decoder 72 connected to common bus 15 detects an access to common memory 71, buffer 73 is enabled, allowing common memory 71 to be connected to common bus 15.

An explanation will now be made as to data transmission within common control module 1. This data transmission includes the transmission of data, from the LCPU cards to the MCPU card, which indicate status of terminals collected by respective LCPU card 11 from the associated line/trunk cards and data of call control request information, such as dial digit information and key information of electronic type key telephones to MCPU card 13; and transmission of data, from MCPU card 13 to the LCPU cards, which indicate terminal control data resulting from exchange processing, such as a ringing transmit, ringing receive or clearing acknowledge data.

The aforementioned data transmission is performed through common memory card 14 commonly accessible by the respective CPU in common control module 1. Each LCPU card writes information into common memory card 14, each time information indicating the status change (for example, up and down of a telephone handest) of a terminal is received and, dial information is received. MCPU card 13 periodically polls common memory card 14 and detects the status variation of the terminals. If calling occurs, for example, at a certain terminal, MCPU 13 detects corresponding data in common memory card 14 and performs the processing for calling a corresponding terminal. In a series of call processing routines, MCPU 13 accesses common memory card 14 when it requires data stored in common memory 14 and when it requires data written into the common memory card from the terminals through LCPU. If, as a result of processing, any variation occurs with respect to data for controlling the terminal, this control data is written into the common memory card. On the other hand, respective LCPU also periodically polls the common memory card 14 and detects the variation of terminal control data or fresh data contents.

A system for transmitting control data in a serial form will be explained with reference to FIG. 8. As set out above, the types of terminals (distinction between digital telephone and standard telephone) connected to the respective line/trunk cards are so intially determined that some line/trunk cards correspond to only the digital telephones and that some line/trunk cards correspond to only the standard telephones. The control data and program differ in accordance with the type of terminals. It is required that the control data and program be loaded from the disk device in the common control module into each of the line/trunk cards. This invention is characterized in that common control data and program are loaded from the side of the common control module collectively into a respective group of line/trunk cards to which are connected the same type of terminals, such as digital telephones or standard telephones. This system can markedly reduce the programming time in comparison with the case where the control data and program are loaded one by one into the line/trunk card.

Figure 8:
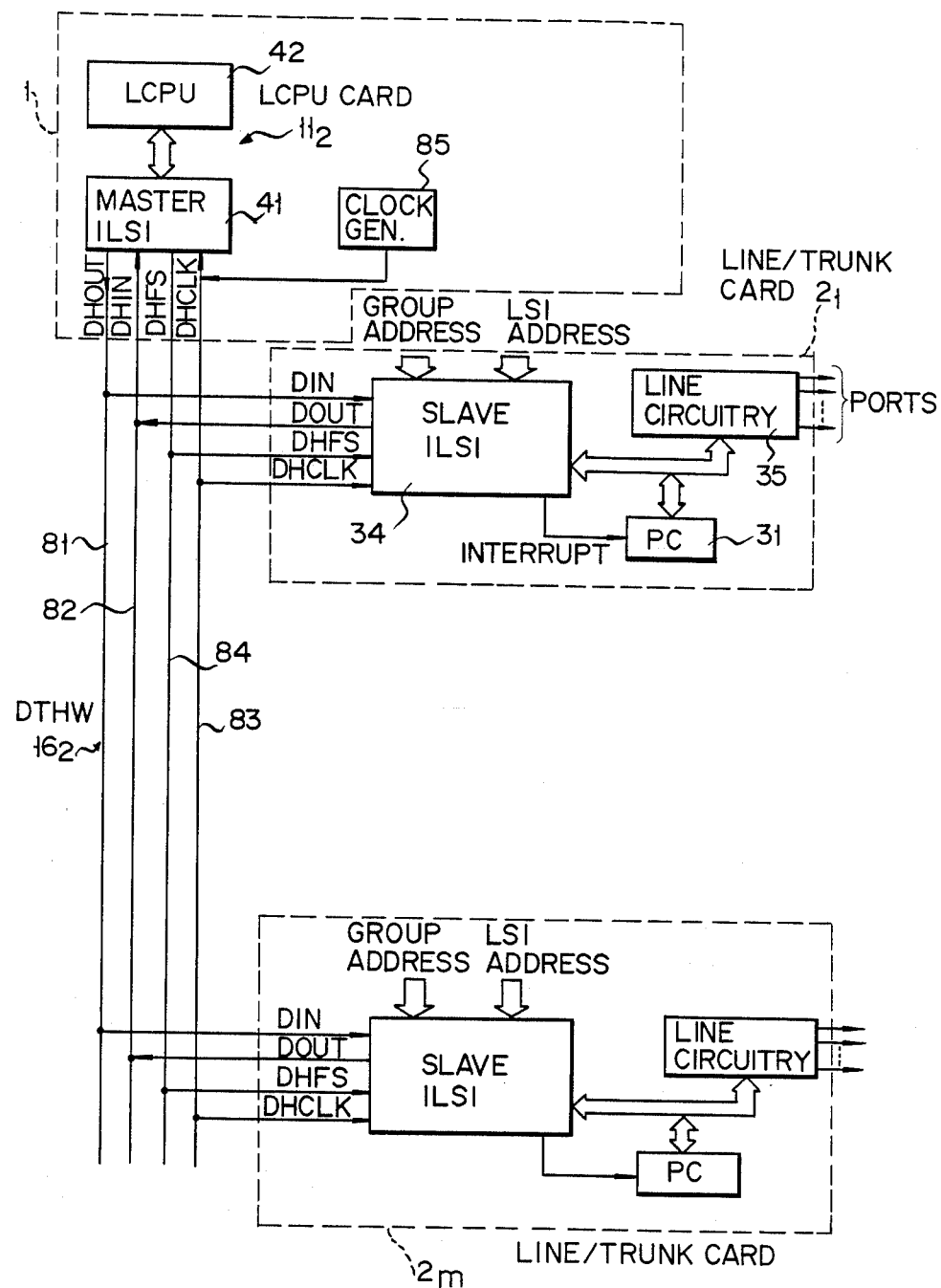
FIG. 8 is diagram for explaining the control data transmission system of this invention.

FIG. 8 typically shows LCPU card $11_2$ and line/trunk module 2 in FIG. 2. LCPU card $11_2$ comprises LCPU 42 and master ILSI 41 which operates in the master mode for data transmission. Line/trunk card 21 includes slave ILSI 34, port controller 31 and line circuitry 35. The other line/trunk cards $2_2$ to $2_m$ have the same configuration. Line circuitry 35 corresponds to digital telephone LSIs $35_1$ to $35_K$ in FIG. 3. ILSI in line/trunk card operates, as set out above, in the slave mode for data transmission. ILSIs 41 and 34 are constituted by an LSI having the same configuration and, as set forth above, and switched in their operation mode by an external mode designation input. The terminal will now be explained below as being a digital telephone.

Control highway DTHW $16_2$ has data output line 81 for transmitting control data from master ILSI 41 to a slave ILSI in the respective line/trunk card, data input line 82 for transmitting control data from the respective slave ILSI to the master ILSI 41, clock signal line 83 for supplying a clock signal DHCLK from clock generator 85, and frame synchronizing signal line 84 for supplying to the respective slave ILSI a frame synchronizing signal DHFS for defining one frame period of time which signal is generated by master ILSI 41 in response to the clock signal.

Master ILSI 41 sends data onto data line 81 in synchronism with a transition in the time slots in one frame period of time and receives data from respective slave ILSIs in response to the detection of a header in the data on data line 82. Master ILSI 41 makes a request-to-receive interruption to LCPU 42 in response to the reception of that data.

Slave ILSI is configured to send data onto data line 82 only at an externally designated time slot in response to frame synchronizing signal FS and clock signal CLKS. Slave ILSI receives data upon the detection of a coincidence between an address (LSI address) of the slave ILSI and an address of data received after the header detection and makes a request-to-receive interruption to port controller 31. Port controller 31 reads received data from a later-described receiving register in the slave ILSI in response to a request for reception and writes the data into a corresponding digital telephone LSI in line circuitry 35. Data from line circuitry 35 is sent to port controller 31 which in turn sends it to slave ILSI 34 where it is stored into a transmitting register as set forth later. Then the slave ILSI sends the contents of receiving register onto data line 82 in the designated time slot.

Figure 9:
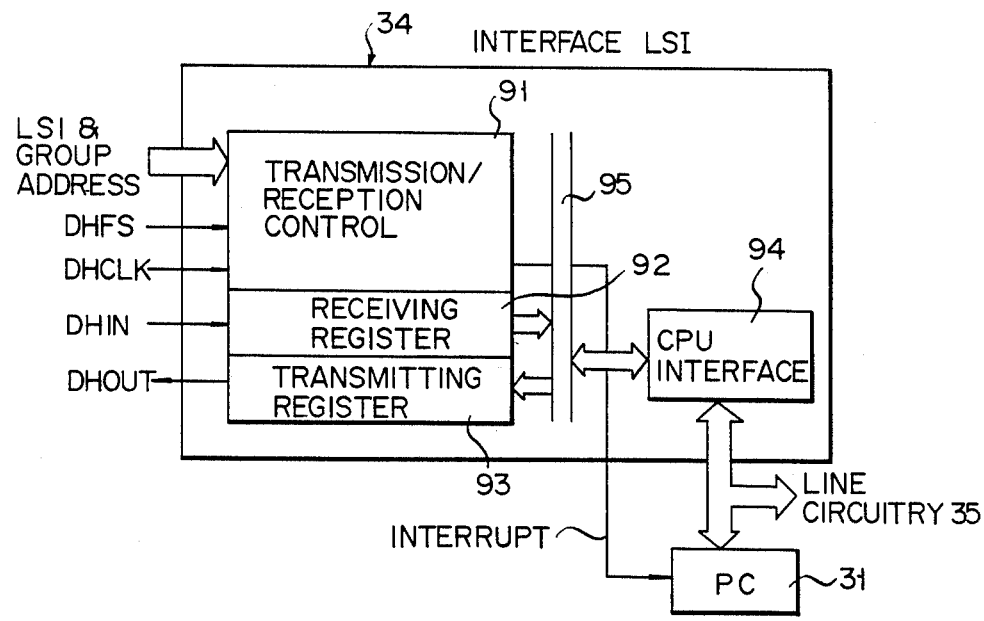
FIG. 9 shows an arrangement of an interface LSI in the line/trunk card of FIG. 1.

FIG. 9 shows a schematic arrangement of ILSI 34 which is applied to the digital telephone in particular. ILSI 34 comprises transmitting/receiving control circuit 91 responsive to an address input peculiar to each LSI, a group address input common to a plurality of LSIs to which are connected to the terminals of the same type, these address inputs being provided by back plate wirings of LSI, to frame synchronizing signal DHFS and to control highway clock signal DHCLK; receiving register 92 for receiving control data transmitted ove data line 81; transmitting register 93 for transmitting control data onto data line 82; CPU interface 94; and bus 95 for connection between transmitting and receiving registers 93 and 92 and interface 94. Where an address field in control data which is received by receiving register 92 indicates LSI address data allocated to the corresponding LSI, group address information showing a group to which this LSI belongs, or general addressing information, then transmitting/receiving control circuit 91 issues an interruption signal to port controller 31. In response to this signal, port controller 31 receives data in a control field and control data field in the received data through interface 94.

Figure 10:
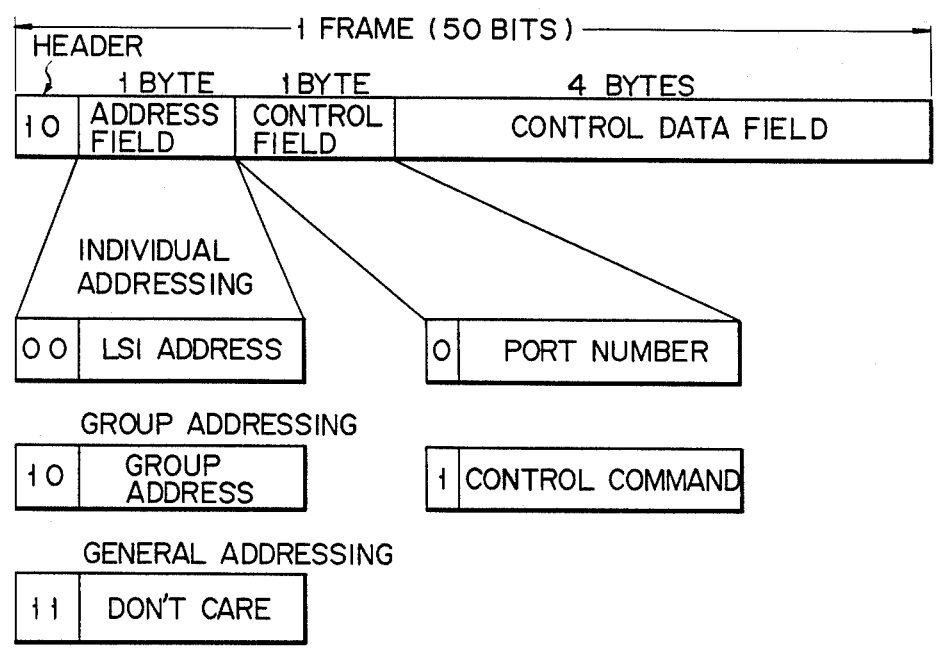
FIG. 10 shows a format for control data.

FIG. 10 shows a format of control data which is transmitted over the control data highway DTHW. The data is transmitted in units of one frame (50 bits). As shown in FIG. 9, one frame is comprised of a 2-bit header, one-byte (eight-bits) address field, one-byte control field and four-byte control data field. The header has "10" bits, showing the start of control data transmitted over a control highway. The address field has MSB two-bit addressing marker information whereby a distinction is made among an individual addressing, group addressing and general addressing. As shown in FIG. 9, the marker information "00" shows individual addressing followed by the 6-bit LSI address information starting with a bit of "0". Marker information "10" shows the group addressing followed by six-bit group address information starting with "0". Marker information "11 " shows general addressing in which case all the ILSIs unconditionally receive the same control data. In a control field, the MSB of "0" is followed by data indicating a port No. denoting the number of the DTLSs $35_1$ to $35_K$. When the MSB is "1", a control command is followed. The control command contains a control code showing, for example, a card damage display, CPU resetting, general or individual down-loading of programs from the control module into the line/trunk cards, etc.

The control data field is comprised of four bytes in which the first byte shows a type of control and the remaining three bytes show control parameters.

Table 1 shows one example of control data loaded from LCPU into the line/trunk card.

TABLE 1

| TYPE | PARAMETERS |
| --- | --- |
| LED CONTROL | NUMBER, LIGHTING PATTERN, COLOR |
| AUDIBLE TONE CONTROL | PITCH, CADENCE |
| MIC/SPEAKER CONTROL | ON/OFF |

Table 2 shows one example of control data transmitted from the line/trunk card to LCPU.

TABLE 2

| TYPE | PATTERN |
| --- | --- |
| HOOK SWITCH | ON/OFF |
| DIAL DIGIT | 0–9 |
| FUNCTION KEY | KEY NUMBER |

In the line/trunk card, received control data is temporarily stored in RAM 33 and CPU 32 sends control data to that DTLSI designated by a port number.

Figure 11:
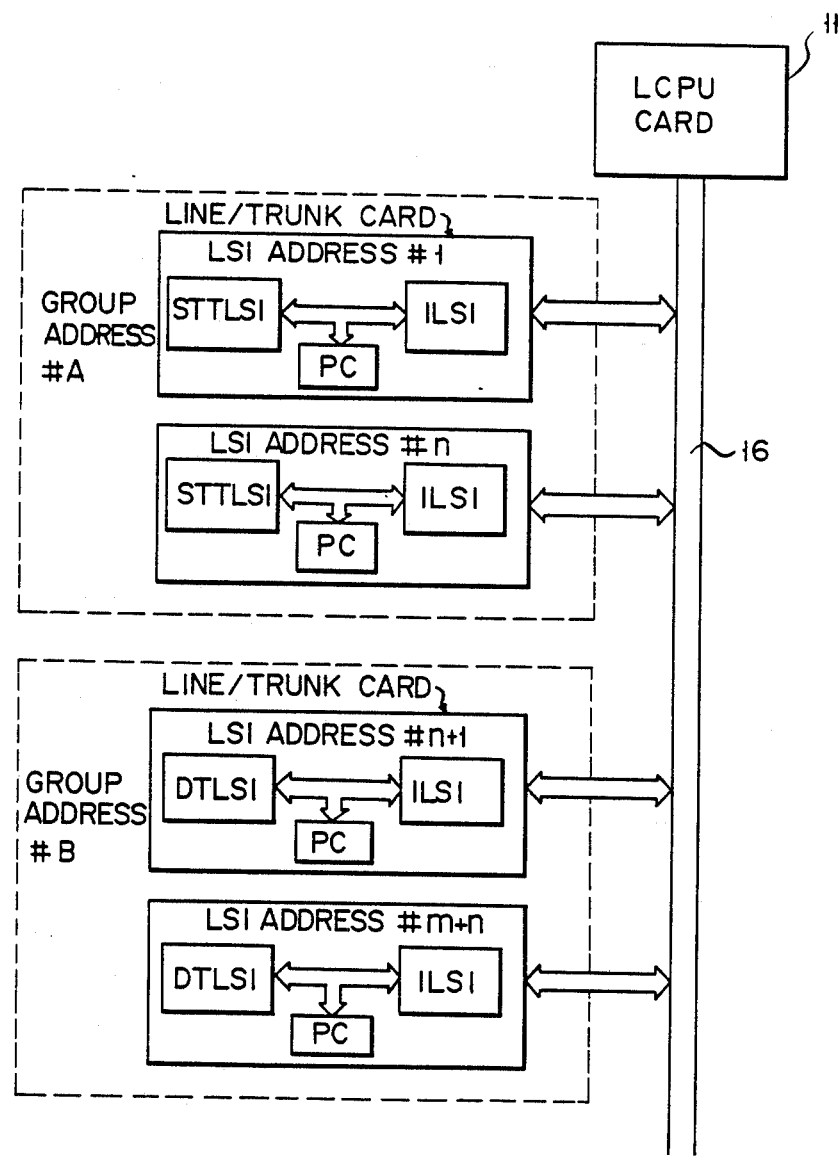
FIG. 11 is a diagram for explaining a group addressing according to this invention.

The function of the control data transmission system of this invention will be described below with reference to FIG. 11.

As set forth above, a plurality of line/trunk cards are coupled to LCPU card 11 through control data highway 16. The same type of terminals (digital telephones, standard telephones or office lines) are connected to the corresponding line/trunk card. In FIG. 11, a group address #A is provided to a plurality of line/trunk cards to which the standard telephones (STT) are coupled and a group address #B is provided to a group of line/trunk cards to which digital telephones (DTT) are coupled. LSI address #1, #n, #n+1 and #n+m are provided to the respective line/trunk cards. During the individual addressing, the respective line/trunk card receives, only when addressed by LCPU card 11, control data from the LCPU card. During the group addressing, on the other hand, a plurality of line/trunk cards having a group address designated by the address field from LCPU card 11 simultaneously receives control data from the LCPU card. During the general addressing, all the line/trunk cards simultaneously receive the control data from LCPU card 11.

Figure 12:
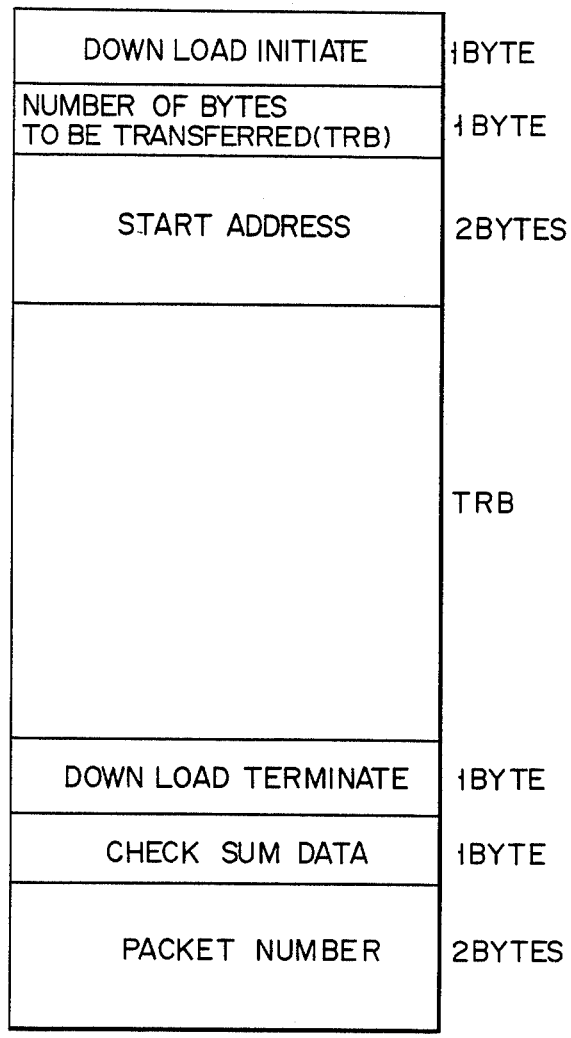
FIG. 12 shows a packet format down-loaded into line/trunk cards from a common control module in the exchange system in FIG. 1.

FIG. 12 shows a packet format used when the LCPU card down-loads control data and program into the line/trunk cards. In the control data field of an intial one frame of control data a down-load initiation information (one byte), information of the number of bytes to be transferred TRB (one byte) and start address information (2 bytes) are transmitted. The control data in the control data field in succeeding control data frames, the number of which is determined by TRB, are sequentially loaded in the RAM in the port controller. Download terminate information (one byte), check sum data (one byte) and data representing a packet number (two bytes) are sent in the final control data frame.

Figure 13:
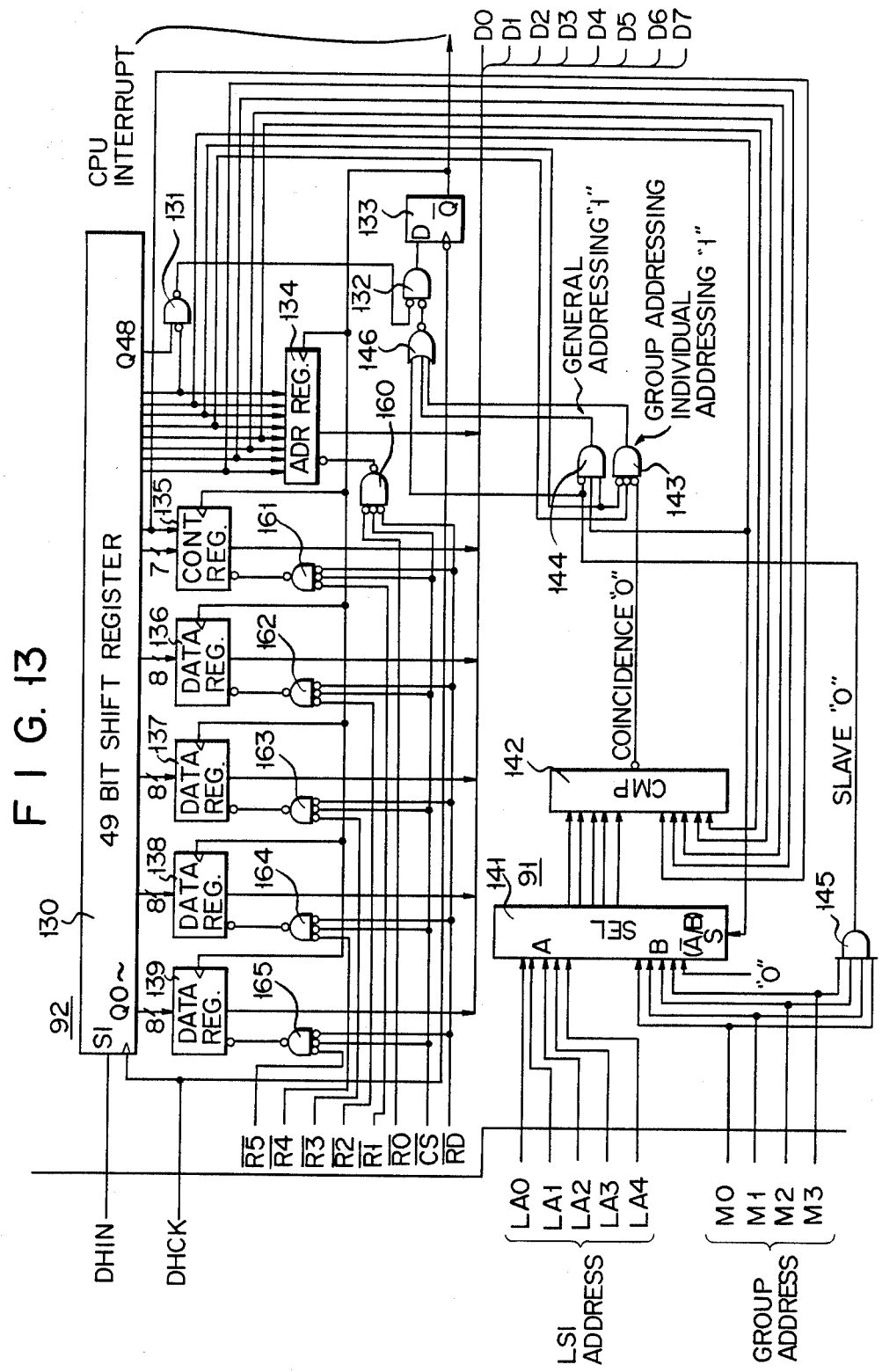
FIG. 13 shows a circuit diagram of a transmitting-/receiving control circuit and a receiving register in FIG. 9.
Figure 15:
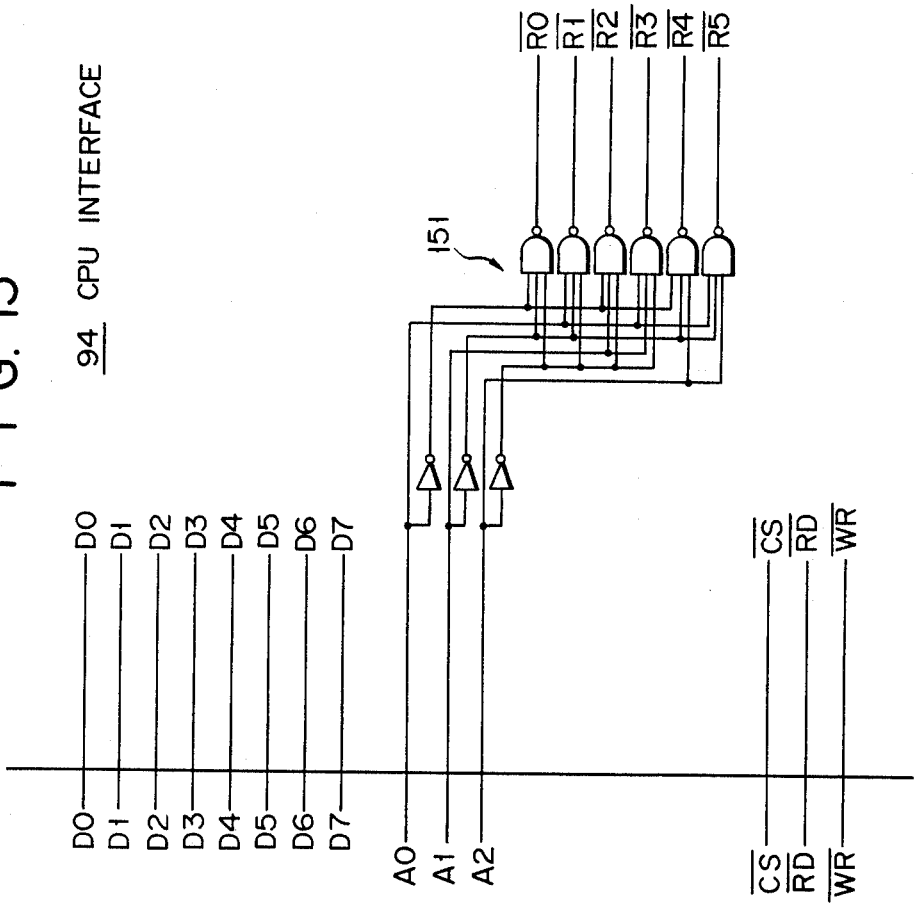
FIG. 15 shows a CPU interface in FIG. 9.

The arrangement of ILSI in FIG. 9 will be explained below with reference to FIGS. 13, 14 and 15 showing the arrangements of receiving register 92 and control circuit 91, transmitting register 93, and CPU interface 94, respectively.

As shown in FIG. 15, PC 31 and interface LSI 33 are connected to each other via data buses $D_0$ to $D_7$. CPU 32 in PC 31 sends an internal register address signal $A_0$ to $A_2$ which is in turn decoded by decoder 151 into register select signals $R_0$ to $R_5$. CPU 32 supplies a chip select signal $\overline{CS}$, read control signal $\overline{RD}$ and write control signal $\overline{WR}$ to ILSI 33.

Referring to FIG. 13, a 49-bit shift register 130 is provided which receives control data DHIN and clock signal DHCLK from data highway DTHW. The MSB and LSB of shift register 130 are denoted b $Q_{48}$ and $Q_0$, respectively. The header "10" of the control data is detected by gate 131 whereby the output of gate 131 goes from a logic 1 to a logic 0 level. The output of gate 131 is coupled through gate 132 to D input of D-type flip-flop (F/F) 133 and clock signal CLK is supplied to the clock input of F/F 133. The output $\overline{Q}$ of F/F 133 feeds, due to its variation from the logic 1 to the logic 0 level, a latch signal to registers 134 to 139 and interruption signal or request-to-receive signal to CPU 32 of port controller 31.

Selector 141 is provided which receives, at first inputs A, address inputs $LA_0$ to $LA_4$ peculiar to this ILSI and, as second inputs B, group address inputs $M_0$ to $M_3$ Bit output Q of shift register 130 is coupled to the select control input of selector 141 which, when the header of the control data is detected by gate 131, corresponds to MSB in the addressing distinction information in the address field of the control data. As shown in FIG. 10, MSB is 0 for the individual addressing and MSB is 1 for group and general addressings.

Selector 141 selects LSI address information $LA_0$ to $LA_4$ when its select control input is at a 0 level and group address information $M_0$ to $M_3$ when its select control input is at a 1 level. The outputs of selector 141 are coupled to first inputs of address comparator 142 and the bit outputs $Q_{43}$ to $Q_{39}$ of shift registers 130 are coupled to second inputs of comparator 142. When the header of data is detected, $Q_{43}$ to $Q_{39}$ outputs show five bits except for the MSB of address data in the address field. As set forth above, the MSB of address data is 0 at all times. When an address coincidence is detected by comparator 142, the output of comparator 142 goes to a logic "0" level. The output of comparator 142 and outputs $Q_{45}$ and $Q_{44}$ of shift register 130 are coupled to gate 143, noting that the output $Q_{45}$ shows the LSB of addressing marker information when the header is detected and that the output $Q_{44}$ shows the MSB of address data which is "0" at all times when the header is detected. As a result, the output of gate 143 goes to a "1" level at the group and individual addressing times. Output $Q_{46}$ and $Q_{45}$ of shift registers 130 and output of gate 145 are coupled to gate 144 and group address information $M_0$ to $M_3$ are coupled to AND gate 145. The group address information $M_0$–$M_3$ is utilized as control information for determining an operation mode of the ILSI and all bits thereof are set to 1 for the master operation mode. Since the ILSI of the line/trunk card is set to the slave mode, the output of AND gate 145 is always "0". The output of gate 144 is 1 for generaly addressing. The outputs of gates 143, 144 and 145 are coupled to NOR gate 146 and the output of the NOR gate is coupled to gate 146.

Registers 134 to 139 are coupled to outputs $Q_{47}$ to $Q_0$ of shift register 130 and data of eight bytes from shift register 130 are latched at a time in response to a latch signal of F/F 133. This is done when, after the header has been detected, the general addressing information, LSI address of its own or group address is detected.

Register select signals $R_0$ to $R_5$, as well as chip select signal $\overline{CS}$ and read control signal RD, are supplied to gates 160 to 164. The output signals of gates 160 to 165 are sequentially applied to registers 134 to 139. As a result, data latched in registers 134 to 139 are sequentially supplied to PC 31 via data buses $D_0$ to $D_7$ As set forth above, the LSI of the respective line/trunk card unconditionally receives control data from LCPU at the time of general addressing and control data from the LCPU card, at the time of individual or group addressing, in response to the detection of the LSI address or the group address.

Referring to FIG. 14, 50-bit transmitting shift register 170 is shown whose inputs $D_1$ and $D_2$ are supplied with "1" and "0" showing the header and whose inputs $D_3$ to $D_{50}$ are coupled to the outputs of eight-bit registers 171 to 176. The outputs of registers 171 to 176 are coupled in common to data bus $D_0$ to $D_7$ Registers 171 to 176 sequentially latch data which are supplied via data bus from PC 31 in response to signals from decoder 177 to which are supplied register select signals $R_0$ to $R_5$, chip select signals e,ovs/CS/ and write control signal $\overline{WR}$. The data latched in registers 171 to 176 are located into 50-bit shift register 170. The output data from shift register 170 is sent out through output buffer 178 which is responsive to a transmit enable signal $\overline{L/S}$. Transmit enable signal $\overline{L/S}$ is generated by transmit enable signal generator 179 which are responsive to LSI address signal $LA_0$ to $LA_4$, clock signal DTCLK, frame synchronizing signal DHFS and the output signal of AND gate 145 in FIG. 13 for determining the master or salve operation mode. In the line/trunk card operating in the slave mode, transmit enable signal generator 179 is arranged to produce the transmit enable signal $\overline{L/S}$ in a time slot specified by the LSI address within one frame period of time. Transmit enable signal has a duration corresponding to 50 clock pulses DHCLK during which the output data is fully sent out from shift register 170.

As set forth above, according to this invention, the control data can be loaded into the corresponding line/trunk cards from the respective LCPU in the common control module and the same control data and program can be down-loaded at a time into the line/trunk cards belonging to the same group. Furthermore, data can be unconditionally loaded into all the corresponding line/trunk cards from the respective LCPU. The advantage of this arrangement is prominently manifested when the system is buit up at the time of the installation or at the time of the restoration of a failure of the system. That is, a time taken for programs, etc., to be loaded depends on the number of the programs, not on the number of line/trunk cards.

What is claimed:

1. A control data transmission system for use in a private branch exchange, comprising:
   a control data highway;
   a plurality of line/trunk cards coupled to said control data highway and to each of which are coupled a plurality of terminals of the same type, a plurality of line/trunk cards associated with said terminals of the same type constituting a group, each of said line/trunk cards including an interface section coupled to said data control highway and to which are coupled address information inherently allocated to the respective line/trunk card and group address information commonly allocated to line/trunk cards belonging to the same group, a programmed port controller coupled to said interface section for receiving control data transmitted over said control data highway and addressed to itself, and terminal interface means coupled to said port controller to control said terminals in accordance with the control data;
   control means including data storage means for storing control data and control programs corresponding to the types of terminals, and data transmitting means coupled to said data storage means for sending in a predetermined format onto said control data highway, a control signal containing address information designating an individual line/trunk card or a group of line/trunk cards belonging to the same type and subsequent control data for controlling said terminals;
   said interface section of each of said line/trunk cards including address detecting means for detecting the address information in the control signal transmitted over said control data highway and for, upon detecting the address information allocated to it and a group address of the group to which it belongs, issuing a request to receive the control data subsequent to the address information to said port controller; and
   said control means being arranged to transmit the group address information and program data onto said control data highway when loading a program corresponding to the type of the terminals into said port controller in each of said line/trunk cards.

2. A control data transmission system according to claim 1, in which said port controller comprises a central processor unit and memory means into which is written the program data which is sent from said control means.

3. A control data transmission system according to claim 1, in which said control means is arranged to transmit a general request-to-receive signal and subsequent control data onto said control data highway; and said interface section in each of said respective line/trunk cards includes means for detecting the general request-to-receive signal from said control means to cause said port controller to unconditionally receive the control data.

4. A control data transmission system according to claim 1, in which the control signal transmitted from said control means to each of said line/trunk cards includes a header, address field and control data field, said address field containing distinction information between individual and group addressings and address information; and said interface section in each of said line/trunk cards comprises a receiving register coupled to said control data highway to receive control data, an address selector for selecting one of first address information inherent to each of said line/trunk cards and second address information for designating a group of line/trunk cards, said address selector being responsive to the addressing distinction information received by said receiving register to select said first address information when the individual addressing information is received and said second address information when the group addressing information is received; an address comparator for comparing address information received by said receiving register with address information selected by said address selector; and means responsive to said address comparator for, when a coincidence is detected between the received address information and the selected address information, issuing to said port controller a request to receive data which has been received by said receiving register.

* * * * *

UNITED STATES PATENT AND TRADEMARK OFFICE
CERTIFICATE OF CORRECTION

PATENT NO. : 4,736,409
DATED : Apr. 5, 1988
INVENTOR(S) : Hiroyuki Hasegawa, et al.

It is certified that error appears in the above-identified patent and that said Letters Patent is hereby corrected as shown below:

On the Title Page

In the address of the Assignee, "Kawsaki" should be corrected to read --Kawasaki--.

Signed and Sealed this

Fourth Day of October, 1988

Attest:

DONALD J. QUIGG

*Attesting Officer*  *Commissioner of Patents and Trademarks*